(12) United States Patent
Jung et al.

(10) Patent No.: US 8,929,247 B2
(45) Date of Patent: Jan. 6, 2015

(54) DEVICE CAPABLE OF NOTIFYING OPERATION STATE CHANGE THEREOF THROUGH NETWORK AND COMMUNICATION METHOD OF THE DEVICE

(75) Inventors: Bae-eun Jung, Seongnam-si (KR);
Tae-sung Park, Yongin-si (KR);
Hae-taek Jung, Suwon-si (KR);
Je-young Maeng, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/085,003

(22) Filed: Apr. 12, 2011

(65) Prior Publication Data

US 2011/0249593 A1   Oct. 13, 2011

Related U.S. Application Data

(60) Provisional application No. 61/323,452, filed on Apr. 13, 2010.

(30) Foreign Application Priority Data

Aug. 6, 2010   (KR) ........................ 10-2010-0076067

(51) Int. Cl.
*H04J 1/16*      (2006.01)
*G08C 15/00*   (2006.01)
*G06F 11/00*   (2006.01)
*G01R 31/08*   (2006.01)

(52) U.S. Cl.
USPC ............ 370/254; 370/216; 370/331; 709/223

(58) Field of Classification Search
USPC .......... 370/216–350, 401–470; 455/404–556; 709/206–216, 223–228; 340/286–310
See application file for complete search history.

(56) References Cited

U.S. PATENT DOCUMENTS 6,574,662 B2 *   6/2003   Sugiyama et al. ............. 709/223
6,631,407 B1 *  10/2003   Mukaiyama et al. ......... 709/223
(Continued)

FOREIGN PATENT DOCUMENTS

CN        1961298 A      5/2007
CN        101304350 A    11/2008
(Continued)

OTHER PUBLICATIONS

Communication dated Dec. 7, 2011 issued by the International Searching Authority in counterpart International Application No. PCT/KR2011/002467.

(Continued)

*Primary Examiner* — Man Phan
(74) *Attorney, Agent, or Firm* — Sughrue Mion, PLLC

(57) ABSTRACT

A method of notifying an operation state change of a device, the method involving forming a network of devices used by a user and that perform network communication; when an operation state change of a first device in the network occurs, searching for at least one device currently being used by the user in the network of devices; and transmitting information regarding the operation state change of the first device to the at least one device, wherein the information regarding the operation state change of the first device is displayed on a display unit of the at least one device.

35 Claims, 10 Drawing Sheets

(56) References Cited

U.S. PATENT DOCUMENTS

| | | | |
|---|---|---|---|
| 6,731,201 B1* | 5/2004 | Bailey et al. | 340/12.32 |
| 6,924,727 B2* | 8/2005 | Nagaoka et al. | 340/3.1 |
| 6,930,598 B2* | 8/2005 | Weiss | 340/531 |
| 7,395,326 B2* | 7/2008 | Hikida et al. | 709/223 |
| 8,019,875 B1* | 9/2011 | Nielsen | 709/227 |
| 8,117,470 B2* | 2/2012 | Oh et al. | 713/310 |
| 8,122,506 B2* | 2/2012 | Harvey et al. | 726/23 |
| 8,150,982 B2* | 4/2012 | Zhang et al. | 709/228 |
| 2007/0237115 A1* | 10/2007 | Bae et al. | 370/331 |
| 2008/0143517 A1 | 6/2008 | Goffin | |
| 2008/0224834 A1* | 9/2008 | Oosaka et al. | 340/286.02 |
| 2009/0073871 A1* | 3/2009 | Ko et al. | 370/216 |
| 2010/0005166 A1* | 1/2010 | Chung | 709/224 |
| 2010/0009704 A1 | 1/2010 | Fan et al. | |
| 2010/0057921 A1* | 3/2010 | Zhang et al. | 709/228 |
| 2010/0208746 A1* | 8/2010 | Rahman | 370/464 |
| 2011/0045809 A1* | 2/2011 | Yu et al. | 455/414.1 |
| 2011/0054644 A1* | 3/2011 | Baek et al. | 700/90 |
| 2012/0166660 A1 | 6/2012 | Zhang et al. | |
| 2014/0012967 A1* | 1/2014 | Agarwal et al. | 709/223 |

FOREIGN PATENT DOCUMENTS

| | | |
|---|---|---|
| JP | 2004-15169 A | 1/2004 |
| JP | 2006-18623 A | 1/2006 |
| KR | 1020040051022 A | 6/2004 |
| KR | 1020060006619 A | 1/2006 |
| KR | 1020090125781 A | 12/2009 |
| KR | 1020110020146 A | 3/2011 |
| WO | 2011021886 A3 | 2/2011 |

OTHER PUBLICATIONS

Communication dated Jan. 7, 2014 issued by the Japanese Patent Office in counterpart Japanese Patent Application No. 2013-504808.
Communication dated Nov. 17, 2014, issued by the State Intellectual Property Office of P.R. China in counterpart Chinese Application No. 201180027821.9.

* cited by examiner

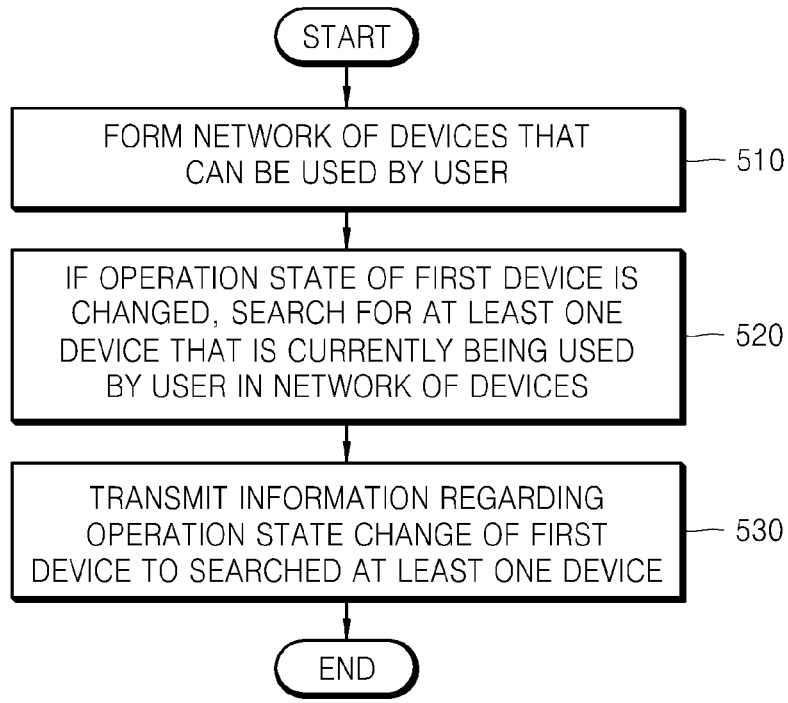
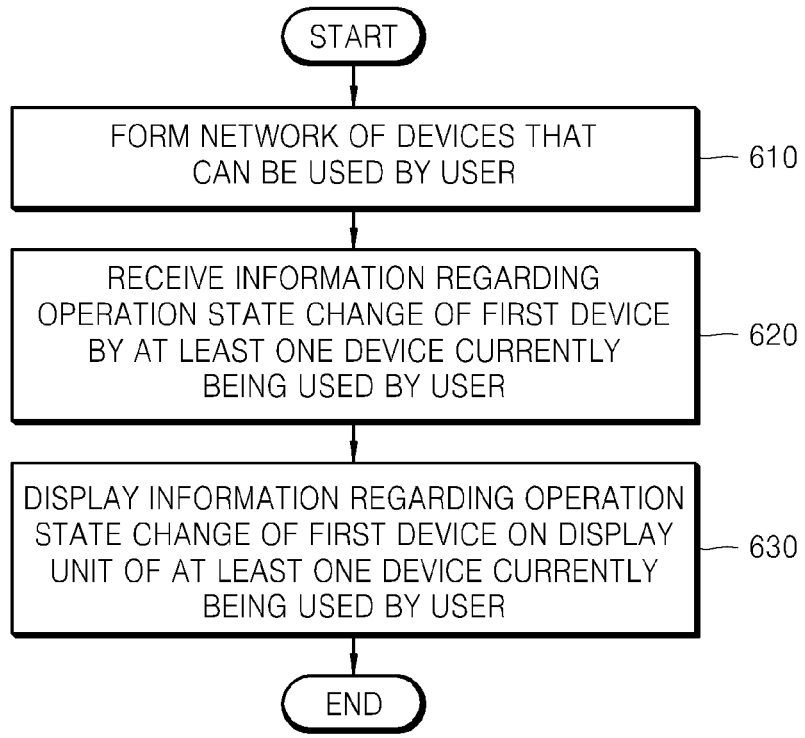

DEVICE CAPABLE OF NOTIFYING OPERATION STATE CHANGE THEREOF THROUGH NETWORK AND COMMUNICATION METHOD OF THE DEVICE

CROSS-REFERENCE TO RELATED PATENT APPLICATIONS

This application claims the benefit of U.S. Provisional Patent Application No. 61/323,452, filed on Apr. 13, 2010, in the U.S. Patent and Trademark Office, and the benefit of Korean Patent Application No. 10-2010-0076067, filed on Aug. 6, 2010, in the Korean Intellectual Property Office, the disclosures of which are incorporated herein in their entirety by reference.

BACKGROUND

1. Field

Methods and apparatuses consistent with exemplary embodiments relate to the sharing of information between devices via a network.

2. Description of the Related Art

Most electronic devices are able to communicate via a network, and are equipped with a display screen for displaying various types of information. However, users are not able to carry with them all of their electronic devices. As a result, these users cannot take immediate action on those electronic device which they do not carry, which undergo an operation state change.

SUMMARY

Aspects of exemplary embodiments provide a technique for sharing information regarding a state change between devices capable of performing network communication.

According to an aspect of an exemplary embodiment, there is provided a method of notifying an operation state change of a device, the method including the operations of forming a network of devices that can be used by a user and that perform network communication; when an operation state change of a first device in the network occurs, searching for at least one device that is currently being used by the user in the network; and transmitting information regarding the operation state change of the first device to the at least one device, wherein the information regarding the operation state change of the first device is displayed on a display unit of the at least one device.

When the first device is changed to a second operation state by receiving a user response with respect to a change in a first operation state of the first device, the method may further include the operation of transmitting information indicating a change in the second operation state of the first device to the at least one device. The user response may be input to the first device or to the at least one device.

The operation of searching may include the operations of waiting for an input from the user for a predetermined time after occurrence of the operation state change of the first device; and searching for the at least one device currently being used by the user in the network after the predetermined time elapses. The predetermined time may be set to be equal to or greater than 0. As soon as a state of the first device is changed, the operation of searching may include the operation of searching for the at least one device that is currently being used by the user in the network.

When the at least one device currently being used by the user cannot be found in the network, the operation of searching may include the operation of searching for the at least one device currently being used by the user in a sharing network accessible by the first device.

When the at least one device currently being used by the user cannot be found in the network, the operation of searching may include the operation of searching for the at least one device currently being used by the user in a list of devices accessible by the first device.

After the network is formed, the operation of forming the network may include the operations of notifying the network of a service supported by the first device and registering a list of devices that are from among the devices in the network and that can process an event related to the service.

The operation of searching may include the operation of searching in the list so as to search for the at least one device currently being used by the user in a sharing network accessible by the first device.

The operation of searching may include the operation of transmitting a search signal indicating a search for the at least one device currently being used by the user to one or more devices of the network.

The operation of searching may include the operation of receiving, from one or more devices of the network, information indicating whether the one or more devices are currently being used by the user.

The operation of searching may include the operations of checking if there has been an input to one or more devices of the network from the user within a predetermined time; and determining a device to which there has been an input from the user within the predetermined time as the at least one device currently being used by the user.

The information regarding the operation state change may include notification information indicating occurrence of the operation state change of the first device and detail information indicating details of the operation state change of the first device. The information regarding the operation state change may include at least one of notification information indicating occurrence of a change in a first operation state of the first device, detail information indicating details of the first operation state of the first device, notification information indicating occurrence of a change in a second operation state of the first device, and detail information indicating details of the second operation state of the first device.

The operation of transmitting the information may include the operation of converting the detail information indicating the details of the operation state change into a format that can be displayed by the at least one device and then transmitting the converted information.

The detail information may be converted into a format that can be displayed by the at least one device via a management server of the network and then transmitted.

The operation state change of the first device may include message reception.

Each device included in the network may include a display unit.

According to another aspect of an exemplary embodiment, there is provided a method of notifying an operation state change of another device, the method including the operations of forming a network of a first device and at least one other device that can be used by a user and that perform network communication; receiving information regarding the operation state change of the first device by at least one device currently being used by the user, from the first device, which has searched for the at least one device currently being used by the user in the network; and displaying the information regarding the operation state change of the first device on a display unit of the at least one device currently being used by the user.

When the first device is changed to a second operation state by receiving a user response with respect to a change in a first operation state of the first device, the method may further include the operation of receiving information indicating a change in the second operation state from the first device.

The method may further include the operation of generating, by a second device currently being used by the user in the network, a signal indicating that the user currently uses the second device.

When a search signal indicating a search for a device currently being used by the user is received from the first device, the operation of generating the signal may include the operation of transmitting, by the second device currently being used by the user in the network, the signal indicating that the user currently uses the second device to the first device.

When it is recognized that the user currently uses the second device in the network, the method may further include the operation of generating and transmitting, by the second device, the signal indicating the user currently uses the second device.

The signal indicating the user currently uses the second device may be generated based on at least one of whether there has been an input to the second device from the user within a predetermined time, whether the user logs into the second device, and a result of a sensor sensing the user.

The operation of displaying the information may include the operation of setting a position or a size of a screen displaying notification information indicating occurrence of the operation state change of the first device on the display unit.

The method may further include the operation of setting, by the at least one device in the network, whether to display notification information indicating occurrence of the operation state change of the first device on a display unit of the at least one device.

The method may further include the operation of forwarding, by the at least one device in the network, the information regarding the operation state change of the first device received from the first device to another device currently being used by the user in the network. The information indicating the change in the second operation state may further include notification information indicating occurrence of the change in the second operation state of the first device, and detail information indicating details of the second operation state of the first device.

The method may further include the operations of acknowledging the notification information via a second device currently being used by the user; and displaying the details of the operation state change of the first device on the second device based on the detail information.

The method may further include the operations of converting the detail information into a format that can be displayed by a second device currently being used by the user; and displaying the details of the operation state change of the first device on the second device based on the format-converted detail information.

The method may further include the operation of displaying the details of the operation state change of the first device on a second device currently being used by the user based on the detail information, wherein the detail information may be received by the second device after being converted into a format that can be reproduced by the second device via a management server of the network.

The method may further include the operation of displaying the details of the operation state change of the first device on a second device currently being used by the user based on the detail information, wherein the detail information may be received by the second device after being converted by the first device into a format that can be reproduced by the second device.

According to another aspect of an exemplary embodiment, there is provided a device capable of notifying an operation state change thereof, the device including a network communication unit performing network communication among devices that can be used by a user and that can perform network communication; and an operation state change information transmitting unit searching for at least one device that is currently being used by the user in the network when the operation state change of a first device in the network occurs, and generating and transmitting information regarding the operation state change of the first device to the at least one device, wherein the information regarding the operation state change of the first device may be displayed on a display unit of the at least one device.

When the first device is changed to a second operation state by receiving a user response with respect to a change in a first operation state of the first device, the operation state change information transmitting unit may transmit information indicating a change in the second operation state of the first device to the at least one device.

According to another aspect of an exemplary embodiment, there is provided a device capable of notifying an operation state change of another device, the device including a network communication unit performing network communication among devices comprising a first device that can be used by a user and perform network communication; an other-device operation state change information reception unit receiving information regarding an operation state change of the first device by at least one device currently being used by the user, from the first device which has searched for the at least one device currently being used by the user in the network; a display unit; and an other-device operation state change notification control unit performing a control operation to display the information regarding the operation state change of the first device on the display unit.

When the first device is changed to a second operation state by receiving a user response with respect to a change in a first operation state of the first device, the other-device operation state change information reception unit may receive information indicating a change in the second operation state from the first device.

According to another aspect of an exemplary embodiment, there is provided a computer-readable recording medium having recorded thereon a program for executing the method of notifying an operation state change of a device.

According to another aspect of an exemplary embodiment, there is provided a computer-readable recording medium having recorded thereon a program for executing the method of notifying an operation state change of another device.

BRIEF DESCRIPTION OF THE DRAWINGS

The above and/or other aspects of the exemplary embodiments will become more apparent by describing in detail exemplary embodiments thereof with reference to the attached drawings in which:

FIG. 5 is a flowchart illustrating a method of notifying an operation state change of a device, according to an exemplary embodiment;

FIG. 6 is a flowchart illustrating a method of notifying an operation state change of another device, according to an exemplary embodiment;

DETAILED DESCRIPTION OF THE EXEMPLARY EMBODIMENTS

Hereinafter, the exemplary embodiments will be described in detail with reference to the attached drawings.

Figure 1:
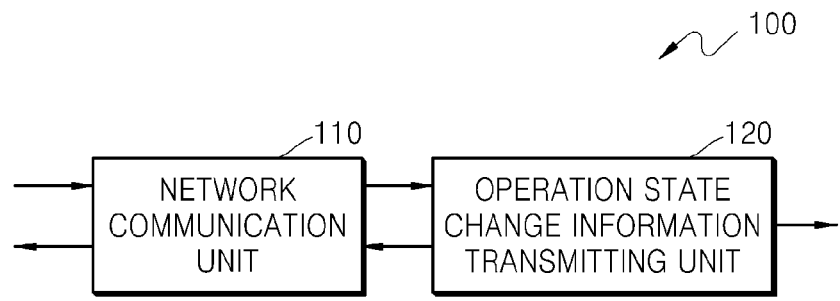
FIG. 1 is a block diagram illustrating a device capable of notifying an operation state change thereof, according to an exemplary embodiment.

FIG. 1 is a block diagram illustrating a device 100 capable of notifying an operation state change thereof, according to an exemplary embodiment.

The device 100 capable of notifying an operation state change thereof includes a network communication unit 110 and an operation state change information transmitting unit 120.

The network communication unit 110 can be used by a user and can perform network communication with devices capable of performing network communication. The devices capable of performing network communication can be used by a single user and may be included in a network formed to allow the devices to perform mutual communication. An example of such a network may be Wireless Fidelity (Wi-Fi) network. However, an operation environment is not limited to a network environment complying with the wireless Wi-Fi standard.

If an operation state change of the current device 100 included in the network of the devices occurs, the operation state change information transmitting unit 120 searches for at least one device currently being used by a user among the other devices included in the network. The operation state change information transmitting unit 120 generates information about the operation state change of the current device 100 and transmits the generated information to the at least one found device that is currently being used by the user.

The transmitted information about the operation state change of the current device 100 is intended to allow the user to handle the operation state change of the current device 100 by notifying the user of whether the operation state of the current device 100 changes via a display unit of another device currently being used by the user. To indicate the information about the operation state change of the current device 100, target devices included in the network of the devices may include display units.

The information about the operation state change of the current device 100 may be output from the operation state change information transmitting unit 120 directly or via the network communication unit 110.

The current device 100 capable of notifying an operation state change thereof may be any type of an electronic device that can perform networking and that can be used by a user. An example of the operation state change of the device 100 may include changing states of various functions of various electronic devices. For example, output of a ring tone of a mobile phone, completion of a washing operation of a washing machine, arrival of the broadcasting start time of a reserved program in a set-top box, completion of downloading of an electronic sound source in an audio equipment, elapsing of the operation time of a reserved cooking function of a microwave oven, and the like may be operation state changes of the device 100 capable of notifying an operation state change thereof.

In a case where a user inputs a user response to the current device 100 by being notified about an operation state change via at least one found device that is currently being used by the user or by recognizing an operation state change via a notification function included in the current device 100 that is currently operating, the current device 100 may transmit state change information and user response information to the other devices included in the network.

For example, in a case where a user directly accepts or rejects a call in a mobile phone receiving the call, information for notifying call acceptance or call rejection may be transmitted to the other devices via a user interface of the mobile phone. Also, in a digital television (TV), when a user inputs a response to reproduce or record a reserved program after being notified about the reserved program broadcasting start time, or in a media player, when a user inputs a response to directly reproduce contents via the media player after a message indicating completion of downloading of the contents is displayed, that is, in a case where a first state change of a device occurs and then a second state change occurs due to a user response input from a user, information for indicating that a corresponding state change is caused by the user response may be transmitted together with the state change information.

Based on information exchanged between the devices, user interfaces provided by the other devices connected to the network may operate in conjunction with a user interface included in the current device 100 that provides the original service. Information about the second state change may be transmitted to the other devices connected to the network via the user interface of the current device 100, so that the user interfaces provided according to the first state change may be changed according to the second state change. The device 100 capable of notifying an operation state change thereof may search for another device currently being used by the user via the network of the devices after a predetermined time has elapsed if the user does not respond to the operation state change of the device 100 for the predetermined time. For example, when the device 100 is a mobile phone, if there is no response from the user during the 20-second ringing of the phone, the device 100 may subsequently search for another device currently being used by the user via the network of the devices.

If a device currently being used by the user to which information about the operation state change of the current device 100 is to be transmitted cannot be found in the network of the devices, the operation state change information transmitting unit 120 may search for the device currently being used by the user in a sharing network accessible by the current device 100. The operation state change information transmitting unit 120 may scan the other devices in a device list database owned by the current device 100 to search for the device currently being used by the user.

The operation state change information transmitting unit 120 may transmit a search signal indicating a search for the device currently used by the user to at least one device included in the network of the devices. Instead of transmitting the search signal, the current device 100 may access target devices to analyze if the user currently uses the target devices, thereby directly finding the device currently being used by the user. For example, a Universal Plug and Play (UPnP) service may be designated by using a UPnP protocol, and then devices registered in the UPnP service may be regarded as devices currently being used by the user.

The device 100 capable of notifying an operation state change thereof may select a target device to which the information about the operation state change of the current device 100 is to be transmitted, by obtaining information indicating the current use or non-use by the user, which is generated and broadcast by the target device.

For the device 100 capable of notifying an operation state change thereof, the user may selectively set the use of an operation state change notifying function to on or off.

The information about the operation state change may include notification information indicating the occurrence of the operation state change of the device 100 and detail information indicating details of the operation state change.

The operation state change information transmitting unit 120 may convert the details of the operation state change of the device 100 into a format that can be displayed by the target device before transmission.

The detail information may be converted into a format that can be reproduced by the target device via a management server of the network before transmission.

For example, the operation state change of the device 100 may include reception of a text-based message such as a Short Message Service (SMS) message. The notification of the operation state change may be performed based on UPnP technology. A message of the device 100 may be converted into text-format data that can be reproduced by the target device and then displayed on the target device. In case of the operation state change where the device 100 receives a text-based message combined with image data or audio data, such as a Multimedia Message Service (MMS) message, the message may be converted into image-format data, audio-format data, and text-format data and then displayed on the target device.

Figure 2:
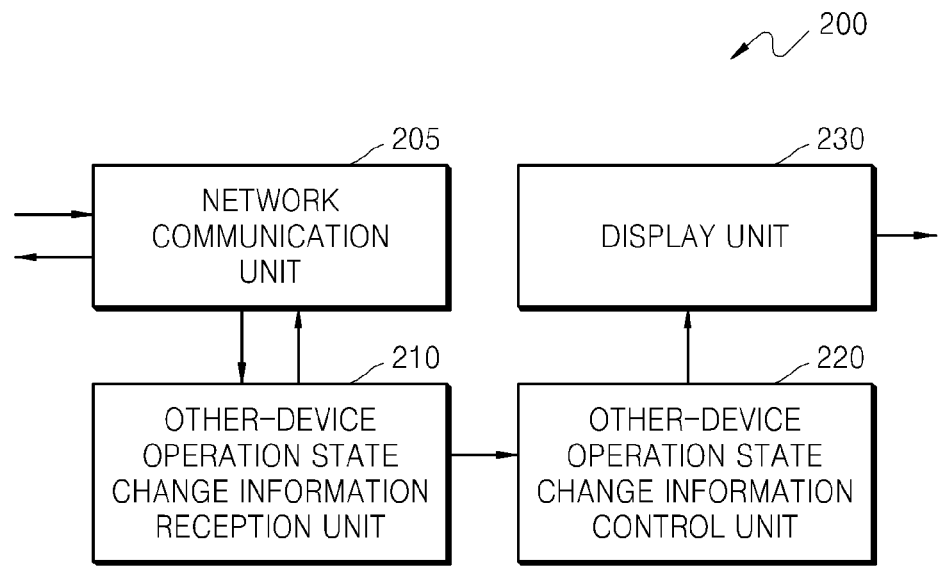
FIG. 2 is a block diagram illustrating a device capable of notifying an operation state change of another device, according to an exemplary embodiment.

FIG. 2 is a block diagram illustrating a device 200 capable of notifying an operation state change of another device, according to an exemplary embodiment.

The device 200 capable of notifying an operation state change of another device includes a network communication unit 205, an other-device operation state change information reception unit 210, an other-device operation state change notification control unit 220, and a display unit 230. The device 200 capable of notifying an operation state change of another device may be included in the network of the devices, together with the device 100 capable of notifying an operation state change thereof, which has been described above with reference to FIG. 1.

The network communication unit 205 can be used by a user and performs network communication with the devices capable of performing network communication.

The other-device operation state change information reception unit 210 searches for at least one device which is currently being used by the user in the network of the devices, and receives, from a first device included in the network of the devices, information about an operation state change of the first device. The first device may be the device 100 described above with reference to FIG. 1.

The information about the operation state change of the first device may be input to the other-device operation state change information reception unit 210 directly or via the network communication unit 205.

The device 200 capable of notifying an operation state change of another device may receive a search signal indicating a search for the device currently being used by the user, from the first device. The device 200 may recognize whether the user currently uses the device 200 based on the search signal and provide a signal indicating the current use or non-use of the user to the first device.

The device 200 capable of notifying an operation state change of another device may receive a search signal indicating a search for a device capable of providing a change notification function with respect to application services included in the first device, and an appropriate user interface, from the first device.

The device 200 may accept an access permit request from the first device, which requests a direct access to the device 200 to analyze if the user currently uses the device 200.

The device 200 may periodically generate and broadcast a signal indicating the current use or non-use of the user. The first device searching for the device currently being used by the user may find out the device currently being used by the user by obtaining the signal indicating the current use or non-use of the user, generated and broadcast by the device 200.

To determine whether the user currently uses a predetermined device, it is determined whether an instruction or information from the user has been input during a past predetermined time, whether the user logs in the device, or whether the user is situated within a sensor sensing range of the device.

It is possible to determine whether the user is currently using the predetermined device, based on a list that is previously designated by the user. For example, when the network is formed between devices, if the devices are registered via a service search and registration process such as UPnP, a Simple Service Discovery Protocol (SSDP) or the like, the devices may be regarded as the devices that are currently being used.

The device 200 capable of notifying an operation state change of another device may forward information indicating the operation state change, received from the first device, to another device included in the network of the devices.

The other-device operation state change notification control unit 220 performs a control operation such that notification information indicating the occurrence of an operation state change of the first device is displayed on the display unit 230. The information about the operation state change of the first device may be displayed by using a notification display window. The display manner of the notification display window, such as position, size, transparency, flickering frequency, color, and the like, may be set.

The information about the operation state change may include notification information indicating the occurrence of the operation state change of the first device, detail information indicating details of the operation state change, and information indicating that the operation state change occurs due to a user response with respect to the first device.

The other-device operation state change notification control unit 220 may convert the details of the operation state change of the first device into a format that can be displayed by the device 200.

The detail information may be converted into a format that can be reproduced by the device 200 via a management server of the network and then received by the other-device operation state change information reception unit 210.

The other-device operation state change information reception unit 210 may receive the detail information transmitted after being converted by the first device into data in a format that can be reproduced by the device 200.

The other-device operation state change notification control unit 220 may perform a control operation such that a reception acknowledgement window for the notification information indicating the occurrence of the operation state change of the first device is displayed on the display unit 230. Upon reception of an acknowledgement from the user, the details of the operation state change of the first device may be displayed on the display unit 230 based on the detail information in a reproducible format.

Before the reception acknowledgement is received from the user, the device 200 may receive again information about the operation state change from the first device 100. In this case, the device 200 may receive the information about the operation state change together with information indicating whether the operation state change that occurred in the first device 100 was caused by a user response with respect to the first device 100.

Thus, if the operation state change of the first device is reception of an SMS message, the SMS message of the first device may be converted into text-format data that can be reproduced by the device 200 and then displayed on the display unit 230. In case of the operation state change where the first device receives a text-based message combined with image data or audio data, such as an MMS message, the message may be converted into image-format data, audio-format data and text-format data that can be reproduced by the device 200 and then displayed on the display unit 230. After completion of reception or display of the notification information or the detail information associated with the operation state change of the first device, the device 200 may inform the first device that the user acknowledges the operation state change.

According to an exemplary embodiment, by using the device 100 capable of notifying an operation state change thereof and the device 200 capable of notifying an operation state change of another device, the device 100 currently undergoing an operation state change automatically searches for the device 200 currently being used by the user to allow the user to effectively respond to the operation-state-changed device 100. In addition, to search for a device currently being used by the user, devices included in an accessible network are sequentially scanned, thereby finding a target device to which notification information indicating the occurrence of an operation state change is to be transmitted.

For example, where the network of the devices is formed via UPnP service registration, the devices that are registered by using the SSDP may be regarded as the devices that are currently being used by the user. Also, only some of the devices from among the devices that are registered by using the SSDP, which are previously designated by the user, may be regarded as the devices that are currently being used by the user.

With reference to FIGS. 1 and 2, the device 100 capable of notifying an operation state change thereof and the device 200 capable of notifying an operation state change of another device have been described separately. However, by incorporating all components of the device 100 and the device 200 in a single device, information about an operation state change of a current device may be transmitted to the other devices included in a network of devices, and information about an operation state change of another device may be received and displayed on a notification display window.

Figure 3A:
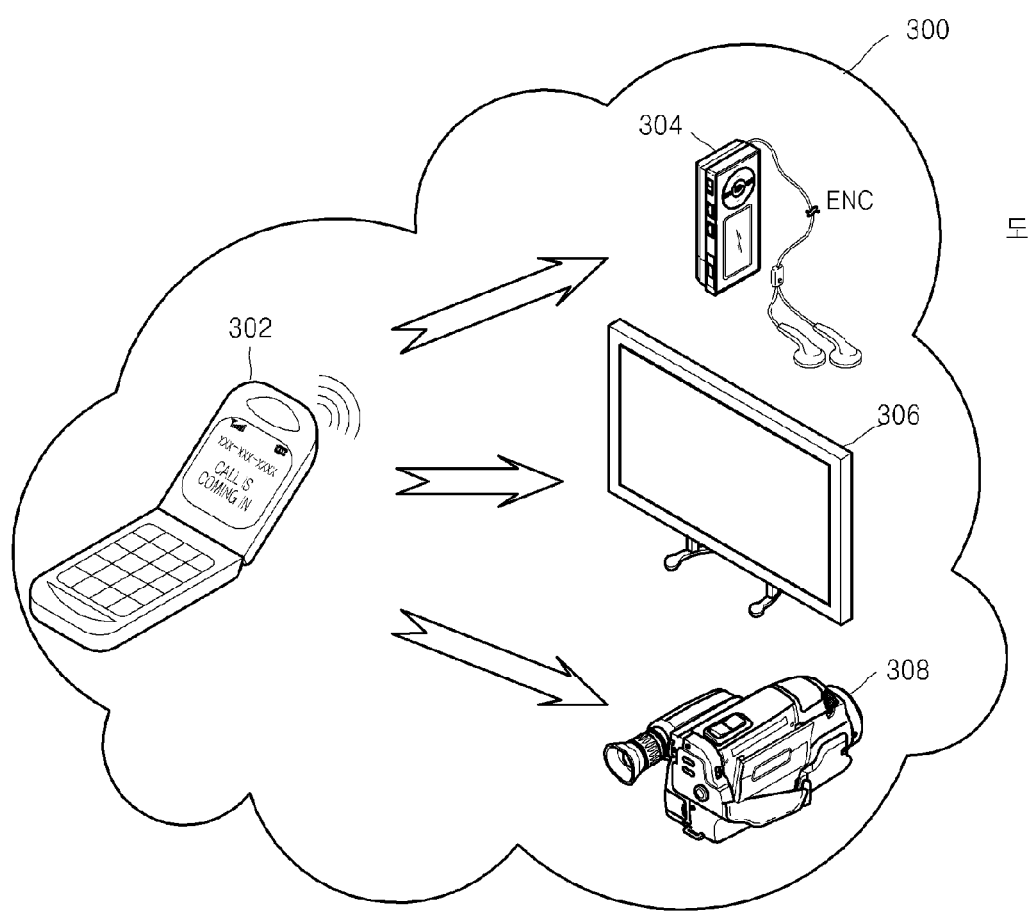
FIG. 3A is a diagram illustrating a network of devices, according to an exemplary embodiment.

FIG. 3A is a diagram illustrating a network 300 between devices, according to an exemplary embodiment.

Included in the network 300 are a mobile phone 302, a small-size audio equipment 304, a digital TV 306, and a digital camcorder 308. All of the mobile phone 302, the small-size audio equipment 304, the digital TV 306, and the digital camcorder 308 can perform network communication and are mutually registered as devices included in the same network 300.

For example, the mobile phone 302 may be an example of the device 100 capable of notifying an operation state change thereof and the other devices included in the network 300, that is, the audio equipment 304, the digital TV 306, and the digital camcorder 308 may be examples of the device 200 capable of notifying the operation state change of another device described with reference to FIG. 2.

If there is no response from the user to the ringing of the mobile phone 302, the mobile phone 302 searches for a target device to which information about the current operation state change is to be transmitted in the network 300. The mobile phone 302 may search for a device currently being used by the user among the other devices of the network 300, i.e., the audio equipment 304, the digital TV 306, and the digital camcorder 308. Specifically, the mobile phone 302 may transmit information that notifies the operation state change indicating the ringing of the mobile phone 302 to the found device currently being used by the user.

Figure 3B:
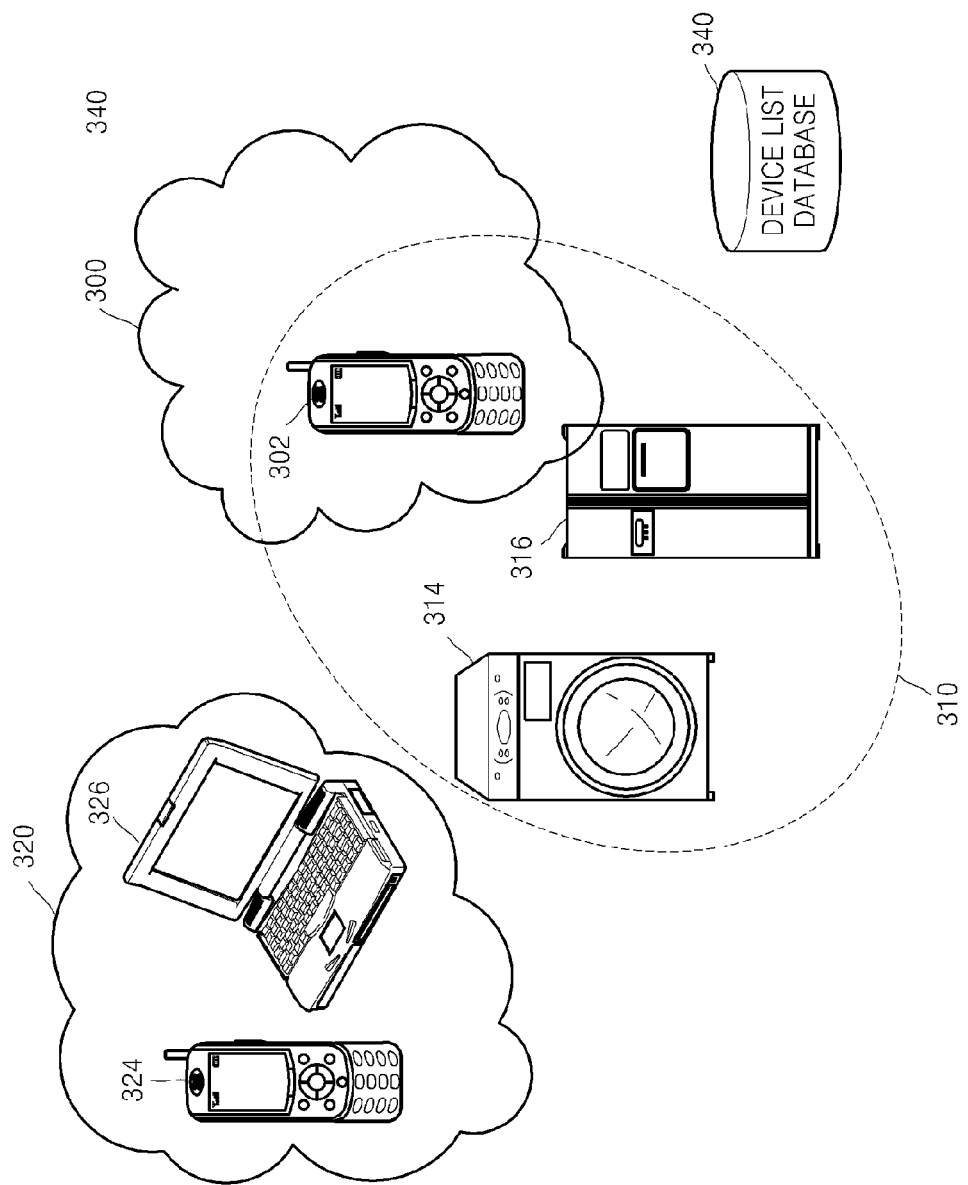
FIG. 3B is a diagram illustrating networks of devices and types of accessible networks, according to an exemplary embodiment.

FIG. 3B is a diagram illustrating networks between devices and types of accessible networks, according to an exemplary embodiment.

The mobile phone 302 searches for a device currently being used by the user in the network 300 between devices provided to share user information with the device 100. However, if the device currently being used by the user is not found in the network 300, the mobile phone 302 may secondarily search a sharing network 310, which includes a washing machine 314, a refrigerator 316, and the mobile phone 302.

The mobile phone 302 may search for the device currently being used by the user via another mobile phone 324 and a notebook 326, which are included in a neighboring infra network 320. If the mobile phone 302 includes a device list database 340 including a list of devices capable of performing network communication, the mobile phone 302 may search for the device currently being used by the user in the list of devices when the user cannot search for the device currently being used by the user in neighboring accessible networks.

FIGS. 4A, 4B, 4C, 4D, 4E, and 4F are diagrams illustrating methods for performing information exchange between a device undergoing an operation state change and a device capable of notifying an operation state change of another device, according to an exemplary embodiment. In the exemplary embodiments illustrated in FIGS. 4A through 4F, a mobile phone 405 is an example of the device 100 capable of notifying an operation state change thereof, and a digital TV 410 is an example of the device 200 capable of notifying an operation state change of another device.

Figure 4A:
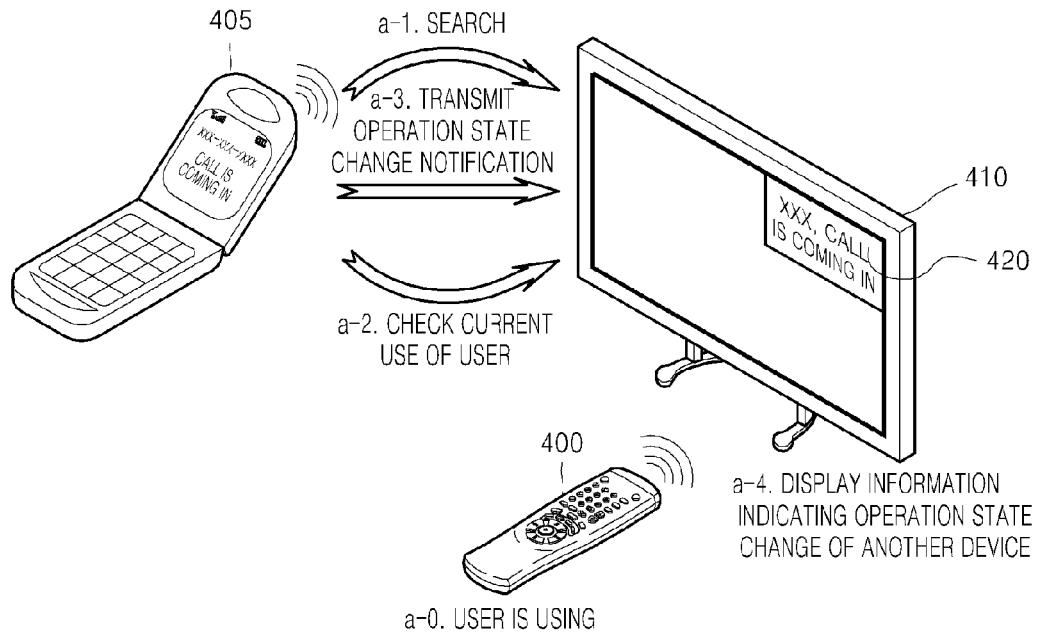
FIG. 4A is a diagram illustrating a first method for information exchange between a device undergoing an operation state change and a device capable of notifying an operation state change of another device, according to an exemplary embodiment.

FIG. 4A is a diagram illustrating a first method for performing information exchange between a device undergoing an operation state change and a device capable of notifying an operation state change of another device, according to an exemplary embodiment.

Referring to FIG. 4A, a user is using the digital TV 410 through a remote control 400 in operation A-0. Although the mobile phone 405 of the user, which is located in another room, rings, the user fails to sense the ringing of the mobile phone 405.

If there is no response from the user in spite of the ringing of the mobile phone 405 for a predetermined time, the mobile phone 405 transmits to the digital TV 410 a search signal indicating a search for a device currently being used by the user in a network of devices, in operation A-1.

The mobile phone 405 checks if the user currently uses the mobile phone in operation A-2. The digital TV 410 may accept an access permit request of the mobile phone 405, or may provide information about the current use requested by the mobile phone 405.

To determine whether the user currently uses the digital TV 410, the mobile phone 405 may analyze a history regarding whether there has been an input of a signal or an instruction from the user within a predetermined time. The mobile phone 405 may determine whether the user currently uses the digital TV 410 based on information about whether the user logs in the digital TV 410 or whether the user is sensed by various sensors mounted on the digital TV 410.

If the mobile phone 405 determines that the user is currently using the digital TV 410, the mobile phone 405 transmits information indicating the ringing of the mobile phone 405, specifically, notification information indicating the occurrence of an operation state change to the digital TV 410 in operation A-3.

The digital TV 410 receives the operation state change notification indicative of the ringing of the mobile phone 405 from the mobile phone 405 and displays information indicating the ringing of the mobile phone 405 of the user on a partial area 420 of the display screen of the digital TV 410 in operation A-4.

Figure 4B:
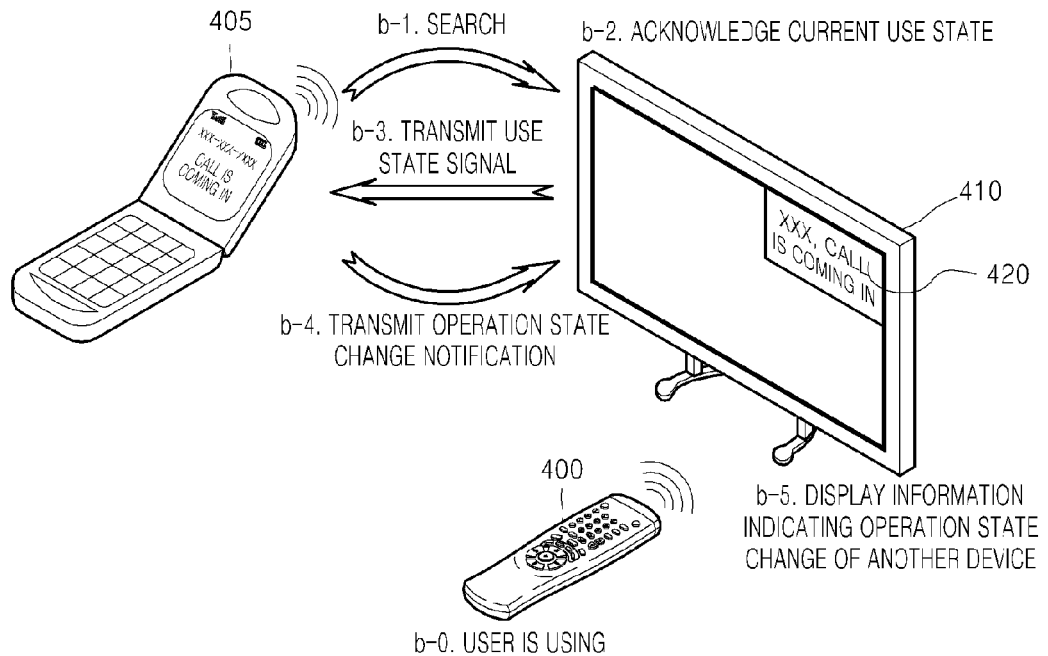
FIG. 4B is a diagram illustrating a second method for information exchange between a device undergoing an operation state change and a device capable of notifying an operation state change of another device, according to an exemplary embodiment.

FIG. 4B is a diagram illustrating a second method for performing information exchange between the device undergoing an operation state change and the device capable of notifying an operation state change of another device, according to an exemplary embodiment.

Referring to FIG. 4B, the user is using the digital TV 410 through the remote control 400 in operation B-0. Although the mobile phone 405 of the user, which is located in another room, rings, the user fails to sense the ringing of the mobile phone 405.

If there is no response from the user in spite of the ringing of the mobile phone 405 for a predetermined time, the mobile phone 405 transmits to the digital TV 410 a search signal indicating a search for the device currently being used by the user in a network of devices in operation B-1.

The digital TV 410 then receives the search signal of the mobile phone 405 and recognizes the current use state of the user in operation B-2. To determine whether the user currently uses the digital TV 410, the digital TV 410 may analyze whether there has been an input of a signal or an instruction from the user within a predetermined time, whether the user logs in the digital TV 410, or whether the user is sensed by various sensors mounted on the digital TV 410.

If the digital TV 410 determines that the user currently uses the digital TV 410, the digital TV 410 transmits a use state signal indicating the user is currently using the digital TV 410 to the mobile phone 405 in operation B-3.

The mobile phone 405 transmits information indicating the ringing of the mobile phone 405, specifically, notification information indicating the occurrence of an operation state change to the digital TV 410 in operation B-4.

The digital TV 410 receives the operation state change notification indicative of the ringing of the mobile phone 405 from the mobile phone 405 and displays information indicating the ringing of the mobile phone 405 of the user on the partial area 420 of the display screen of the digital TV 410 in operation B-5.

Figure 4C:
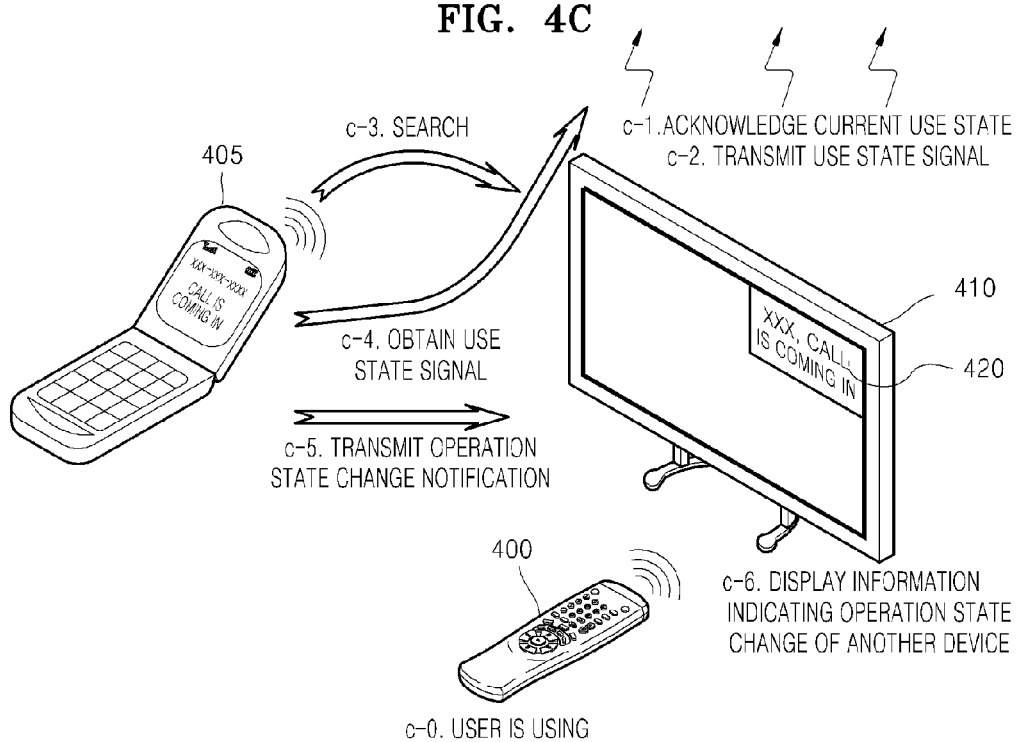
FIG. 4C is a diagram illustrating a third method for information exchange between a device undergoing an operation state change and a device capable of notifying an operation state change of another device, according to an exemplary embodiment.

FIG. 4C is a diagram illustrating a third method for performing information exchange between the device undergoing an operation state change and the device capable of notifying an operation state change of another device, according to an exemplary embodiment.

Referring to FIG. 4C, the user is using the digital TV 410 through the remote control 400 in operation C-0. Although the mobile phone 405 of the user, which is located in another room, rings, the user fails to sense the ringing of the mobile phone 405.

The digital TV 410 frequently checks the current use state of the user in operation C-1. If the user currently uses the digital TV 410, the digital TV 410 broadcasts a use state signal pertaining to the current use state of the user in operation C-2.

If there is no response from the user in spite of the ringing of the mobile phone 405 for a predetermined time, the mobile phone 405 searches for a device currently being used by the user in a network of devices in operation C-3.

The mobile phone 405 recognizes that the user is currently using the digital TV 410 by obtaining the use state signal pertaining to the current use state broadcast by the digital TV 410 in operation C-4.

The mobile phone 405 transmits information indicating the ringing of the mobile phone 405, specifically, notification information indicating an operation state change to the digital TV 410 in operation C-5.

The digital TV 410 receives the operation state change notification indicative of the ringing of the mobile phone 405 from the mobile phone 405 and displays information indicating the ringing of the mobile phone 405 of the user on the partial area 420 of the display screen of the digital TV 410 in operation C-6.

Figure 4D:
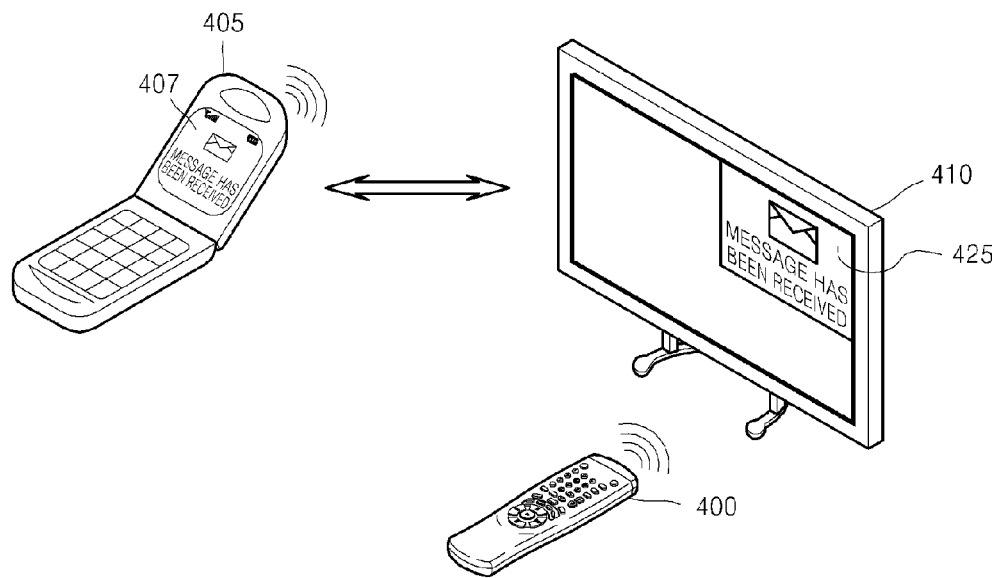
FIG. 4D is a diagram illustrating examples of a device undergoing an operation state change and a device capable of notifying an operation state change of another device, according to an exemplary embodiment.
Figure 4E:
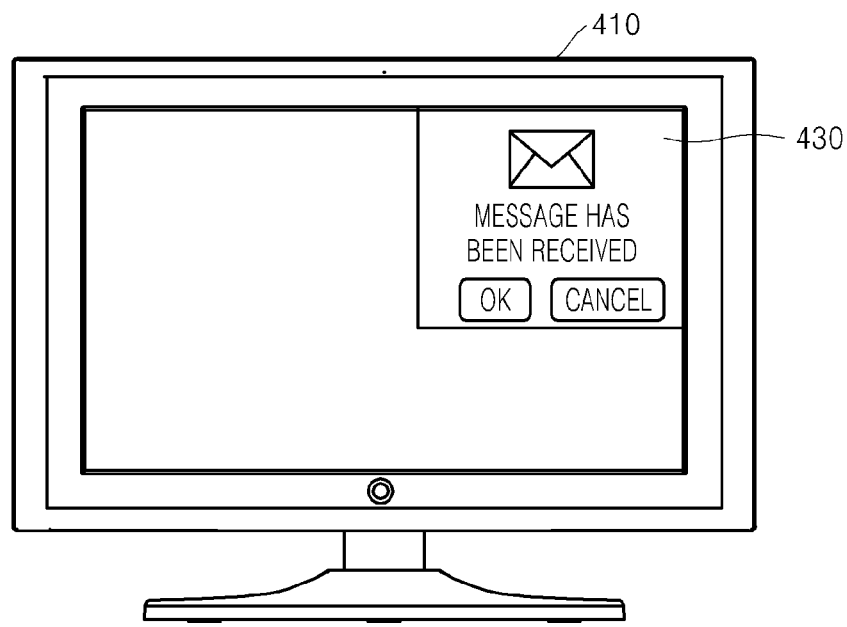
FIGS. 4E and 4F are diagrams illustrating examples of using a device undergoing an operation state change and a device capable of notifying an operation state change of another device, according to an exemplary embodiment.
Figure 4F:
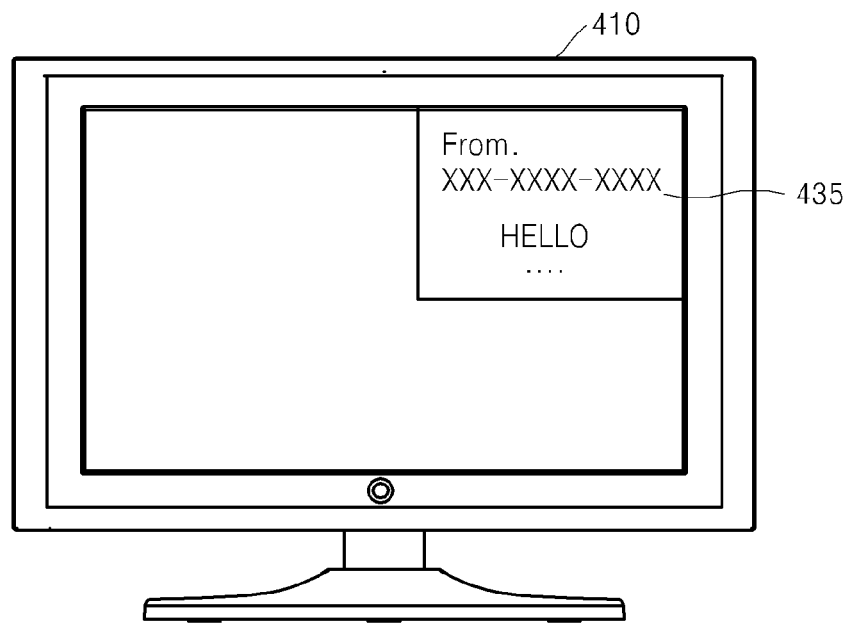

FIGS. 4D, 4E, and 4F are diagrams illustrating examples of the mobile phone 405 undergoing an operation state change and the digital TV 410 capable of notifying an operation state change of another device when a message is received by the mobile phone 405 of the user.

FIG. 4D is a diagram illustrating a device undergoing an operation state change and a device capable of notifying an operation state change of another device, according to an exemplary embodiment.

Referring to FIG. 4D, the user is using the digital TV 410 through the remote control 400. Although an SMS message has been received in the mobile phone 405 of the user, which is located in another room, the user fails to sense the reception of the SMS message in the mobile phone 405.

For exchange of information regarding an operation state change between devices, the mobile phone 405 and the digital TV 410 may exchange information regarding the message reception therebetween through the first method, the second method, and the third method described above.

The digital TV 410 receives notification information indicating the reception of the SMS message in the mobile phone 405, and displays information indicating the SMS message has been received in the mobile phone 405 of the user on a partial area 420 of the display screen.

FIGS. 4E and 4F are diagrams illustrating examples of using a device undergoing an operation state change and a device capable of notifying an operation state change of another device, according to an exemplary embodiment.

The digital TV 410 may receive detail information indicating details of an SMS message, together with notification information indicating the reception of the SMS message in the mobile phone 405. The digital TV 410 displays a message reception notification display window 430 on the screen based on the notification information, and may receive a user input regarding whether to see the received SMS message.

If the user acknowledges the notification information via the digital TV 410, the digital TV 410 may display an SMS message display window 435 of the mobile phone 405 on the screen based on the received detail information of the SMS message.

If the received detail information of the SMS message is not in a format which can be reproduced by the digital TV 410 and displayed on the screen, the digital TV 410 may convert the details information into data in a reproducible format and display the SMS message display window 435 on the screen.

Alternatively, a management server of the network of devices of the user may convert the detail information of the SMS message into a format that can be reproduced by the digital TV 410, and transmit the converted information to the digital TV 410, which then receives the format-converted information and displays the SMS message display window 435 on the screen.

Alternatively, the mobile phone 405 of the user may convert the detail information of the SMS message into a format that can be reproduced by the digital TV 410, and transmit the converted information to the digital TV 410, which then receives the format-converted information and displays the SMS message display window 435 on the screen.

For example, if the mobile phone 405 receives a text-based message such as an SMS message, the received message may be converted into text-format data that can be reproduced by the digital TV 410 and then displayed on the digital TV 410. If the mobile phone 405 undergoes an operation state change by the reception of a text-based message combined with image or audio data, such as an MMS message, the message may be converted into data including image, audio, and text data that can be reproduced by the digital TV 410 and then displayed on the digital TV 410.

After reception or completion of display of the notification information indicating the message reception or the details information of the message in the mobile phone 405, the digital TV 410 may inform the mobile phone 405 that the user acknowledges the message.

The device 100 capable of notifying an operation state change thereof and the device 200 capable of notifying an operation state change of another device, which have been described with reference to FIGS. 1, 2, 3A, 3B, 4A, 4B, 4C, 4D, 4E, and 4F may operate under the control of a central server such as a home server which manages and controls a network of devices.

FIG. 5 is a flowchart illustrating a method of notifying an operation state change of a device, according to an exemplary embodiment.

In operation 510, a network is formed between devices which can be used by a user and perform network communication. A device of the user may be registered in the network of the devices.

In operation 520, if an operation state of a first device is changed in the network, at least one device, which is currently being used by the user, is sought in the network. The first device searches for the device, which is currently being used by the user, in the previously formed network.

To search for the currently being used device, the first device may request information indicating the current use state of the user from the device, analyze an operation history of the device, or obtain the information indicating the current use state of the user broadcast from the device.

In operation 530, the information indicating the current use state of the user is transmitted to the at least one device found to be currently being used by the user. Since the information indicating the operation state change of the first device is displayed on a display unit of the found device, the user may obtain information regarding the operation state change of the first device from a display unit of a second device currently being used by the user.

The information regarding the operation state change of the first device may include notification information indicating the occurrence of the operation state change and detail information indicating details of the operation state change. The detail information of the first device may be converted into data in a format that can be reproduced by the second device via the first device or via a server of the network and then transmitted to the second device.

FIG. 6 is a flowchart illustrating a method of notifying an operation state change of another device, according to an exemplary embodiment.

In operation 610, a network is formed between devices including a first device and at least one device, which can be used by a user and perform network communication.

In operation 620, at least one device currently being used by the user in the network receives information, from the first device, about an operation state change of the first device, which sought the at least one device. The at least one device may receive a search signal indicating a search for the at least one device currently being used by the user from the first device.

The device having received the search signal may check if the user is currently using the device. The device currently being used by the user may broadcast information indicating whether the user currently uses the device, or the first device may access another device to analyze if the user currently uses the device.

In operation 630, information regarding the operation state change of the first device is displayed on a display unit of the at least one device currently being used by the user. The display manner of a notification display window where the information regarding the operation state change of the first device is displayed, such as position, size, transparency, flickering frequency, color, and the like, may be set by a user.

After the device currently being used by the user displays the notification display window on the display screen, an acknowledgement may be input from the user. After the user's acknowledgement, detail information indicating details of the operation state change of the first device may be displayed on a display screen of the device currently being used by the user.

If the detail information of the first device is in a format that cannot be reproduced by the device currently being used by the user, it may be converted into data in a format that can be reproduced by the device currently being used by the user and then displayed on the display screen of the device. Alternatively, the detail information of the first device, which has been converted into data in a format that can be reproduced by the currently being used device via the first device or a server of the network, may be received by the currently being used device. Alternatively, the detail information of the first device may be transmitted after being converted into data in a format that can be reproduced by the display screen of the currently being used device, and the currently being used device may receive the format-converted detail information and reproduce the detail information indicating the details of the operation state change of the first device on the display screen.

Figure 7:
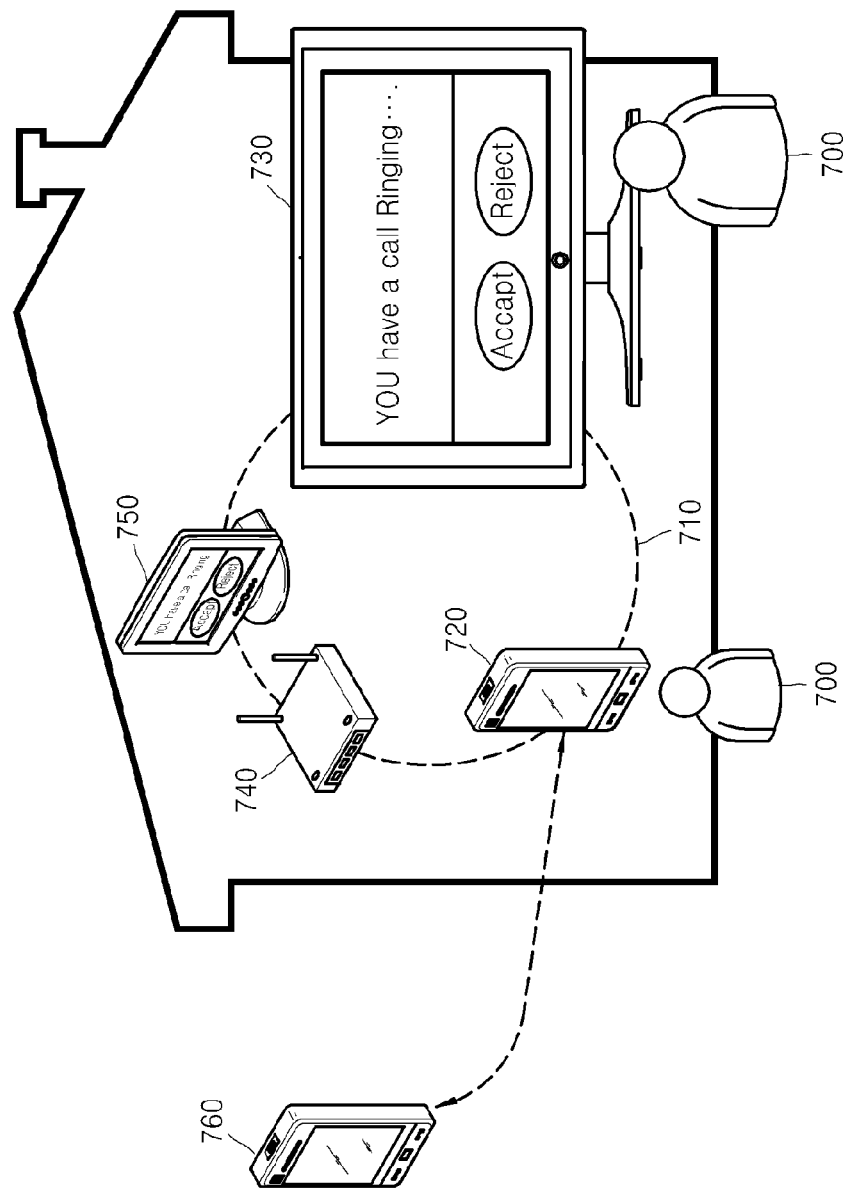
FIG. 7 is a diagram illustrating a first device, and a network of devices, according to an exemplary embodiment.

FIG. 7 is a diagram illustrating a first device, and a network of devices, according to an exemplary embodiment.

The first device may be a mobile phone 720 of a user 700, and the network of devices may be a home network 710 configured of the mobile phone 720 of the user 700, a radio repeater 740, a PC 750, and a TV 730. Each of the mobile phone 720 of the user 700, the radio repeater 740, the PC 750, and the TV 730 supports wireless communication. The user 700 may not carry the mobile phone 720 in a house but may be provided services of the mobile phone 720 via the PC 750, the TV 730, or the like. The PC 750 and the TV 730 both having a networking function and a display screen may display or may reproduce a call signal reception service or the like on the display screen, wherein the call signal reception service is related to a call transmitted from an external mobile phone 760 to the mobile phone 720 of the user 700 via the home network 710. In particular, contents of an event currently occurring in the mobile phone 720 may be notified to the user 700 via the display screen.

Also, based on an appropriate user input, when a call signal is received by a home network using a mobile communication network or a Wi-Fi network, the home network may be set so that the mobile phone 720 directly receives the call signal, or the call signal may be answered by using a videotelephony function of the TV 730 or the PC 750 via a web-cam or a microphone of the TV 730 or the PC 750. With respect to videotelephony, the TV 730 or the PC 750 has a larger display screen than that of the mobile phone 720, so that the user 700 may further conveniently use the videotelephony function.

The TV 730 or the PC 750 may provide a user interface by which the user 700 may select whether to respond to a call signal reception event by using the TV 730 or the PC 750 or by using the mobile phone 720. For example, when the TV 730 or the PC 750 receives a user input command indicating a response to the call signal, and the user input command is transmitted to the mobile phone 720 via the home network 710, the mobile phone 720 may connect the external mobile phone 760 to the TV 730 or the PC 750, which is used by the user 700, and may transmit received video information or audio information.

Although the user 700 receives the call signal reception event via various devices including the TV 730 or the PC 750 in the home network 710, the user 700 may directly answer the call signal by using the mobile phone 720. In a case where the user 700 responds by answering the call signal in the mobile phone 720, a state change thereof may be transmitted to the devices including the TV 730, the PC 750, or the like in the home network 710.

Information indicating a state change of the mobile phone 720 may include not only information about a phone connection state but also include information indicating which device performs the phone connection. If the user 700 already responds to the call signal reception event in the mobile phone 720 so that the phone connection is performed in the mobile phone 720, the display screen of the TV 730 or the PC 750, which previously displayed the call signal reception event, may notify another user that the user 700 answers the phone signal in the mobile phone 720 or may provide an appropriate user interface thereof.

That is, after the mobile phone 720 transmits state information about the call signal reception event to the devices including the TV 730, the PC 750, or the like, if the user 700 accepts or rejects a call in the mobile phone 720 having a telephony client embedded therein, it is necessary to transmit state information indicating occurrence of a response to the call signal reception event to the devices. Here, if information indicating that the user 700 accepts or rejects the call 'by using the mobile phone 720' is transmitted with call signal response state information indicating that 'the call is accepted or rejected', this case will be distinguished from a case in which a call is accepted or rejected by using the TV 730 or the PC 750.

Thus, a device state change notifying method according to an exemplary embodiment may be performed in such a manner that the mobile phone 720 having a telephony client embedded therein may notify other connected devices in the home network 710 about an operation state change of the telephony client of the mobile phone 720, and may transmit various responses to a state change, and information about a cause of the state change.

In a case where a telephony service is used in the devices in the home network 710 which do not have a telephony client, the device state change notifying method may provide an user interface so that the user 700 may appropriately respond to a call signal by using the devices in the home network 710 which do not have the telephony client.

For example, the mobile phone 720 may transmit a call signal reception message via an external network or a phone network, and may notify the TV 730 or the PC 750 that the mobile phone 720 is currently receiving a call signal. In a case where the TV 730 or the PC 750 includes a media engine for video or audio processing, if the user 700 desires to respond to the call signal by using the TV 730 or the PC 750, a message indicating acceptance of the call signal by using the TV 730 or the PC 750 may be transmitted to the mobile phone 720.

Although the user 700 is notified about the call signal reception event via the TV 730 or the PC 750, if the user 700 accepts a call in the telephony client of the mobile phone 720 so as to answer the call by using the mobile phone 720, the mobile phone 720 may transmit a call response message to the external mobile phone 760 and then a phone connection may be made.

In this case, the mobile phone 720 may transmit state change information indicating 'the phone connection is performed by using the mobile phone 720' to the TV 730 or the PC 750, and the TV 730 or the PC 750 may acknowledge that the received call signal is connected and then may provide a user interface for a next user input that may be input in a changed operation state of the mobile phone 720. For example, the TV 730 or the PC 750 may remove a notification user interface for notification of call signal reception, and may display a user interface for providing a call end button on its display screen. After the call signal is disconnected, it is possible to control user interfaces of the devices so as not to activate a call end button on display screens of the devices.

Thus, the user 700 using the devices in the home network 710 may be provided appropriate information related to call reception, regardless of the types of devices.

Figure 8:
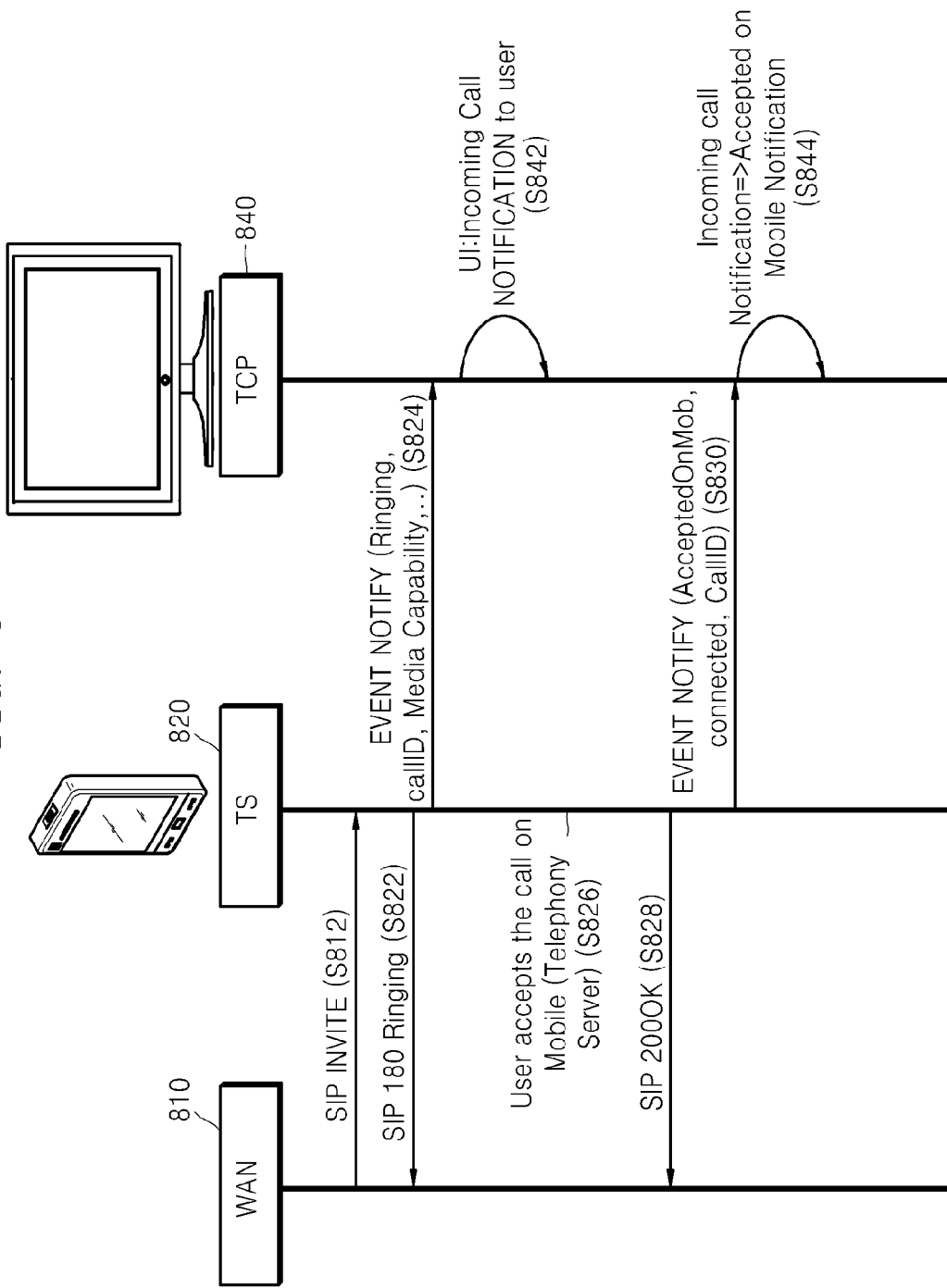
FIG. 8 is a flowchart of a method of notifying an operation state change of a first device and another device in a network, when a user responds to an operation state change of the first device, according to an exemplary embodiment.

FIG. 8 is a flowchart of a method of notifying an operation state change of a first device and another device in a network, when a user responds to an operation state change of the first device, according to an exemplary embodiment.

A user mobile phone 820 that is a telephony server (TS) corresponding to the first device, and a TV 840 based on a Transmission Control Protocol (TCP) configure the network.

A call signal from a caller is transmitted (INVITE) to the user mobile phone 820 via a Wide Area Network (WAN) 810 (operation S812), and the caller is notified that the call signal is received (RINGING) by the user mobile phone 820 via the WAN 810 (operation 5822).

A user may be notified (EVENT NOTIFY) via the TV 840 that the user mobile phone 820 is currently receiving (RINGING) the call signal (operation S824). That is, the user mobile phone 820 may transmit operation state change information indicating reception of the call signal to the TV 840 in a home network. The TV 840 may display a user interface for call notification on its display screen (operation S842).

The user responds to the call signal so as to accept call connection by using the user mobile phone 820 (operation S826). Thus, the user mobile phone 820 may transmit an acceptance message OK 200 to the caller (operation S828), and may notify the user (EVENT NOTIFY) via the TV 840 that the call connection has been accepted by using the user mobile phone 820 (AcceptedOnMob) (operation S830). Accordingly, the TV 840 may remove the user interface for call notification on the display screen and may newly display a user interface for indicating that the call signal has been accepted by the user mobile phone 820 (Accepted on Mobile Notification) (operation S844).

In the method of notifying the operation state change of the first device and the other device according to an exemplary embodiment, the operation state change information including two pieces of information indicating 'the user accepts the call signal by using the user mobile phone 820' and 'the call connection is made' may be transmitted to the TV 840. The TV 840 may configure a user interface for notifying call acceptance by the user, based on the received operation state change information of the user mobile phone 820, and may configure and provide an appropriate user interface screen according to a subsequent state change.

Figure 9:
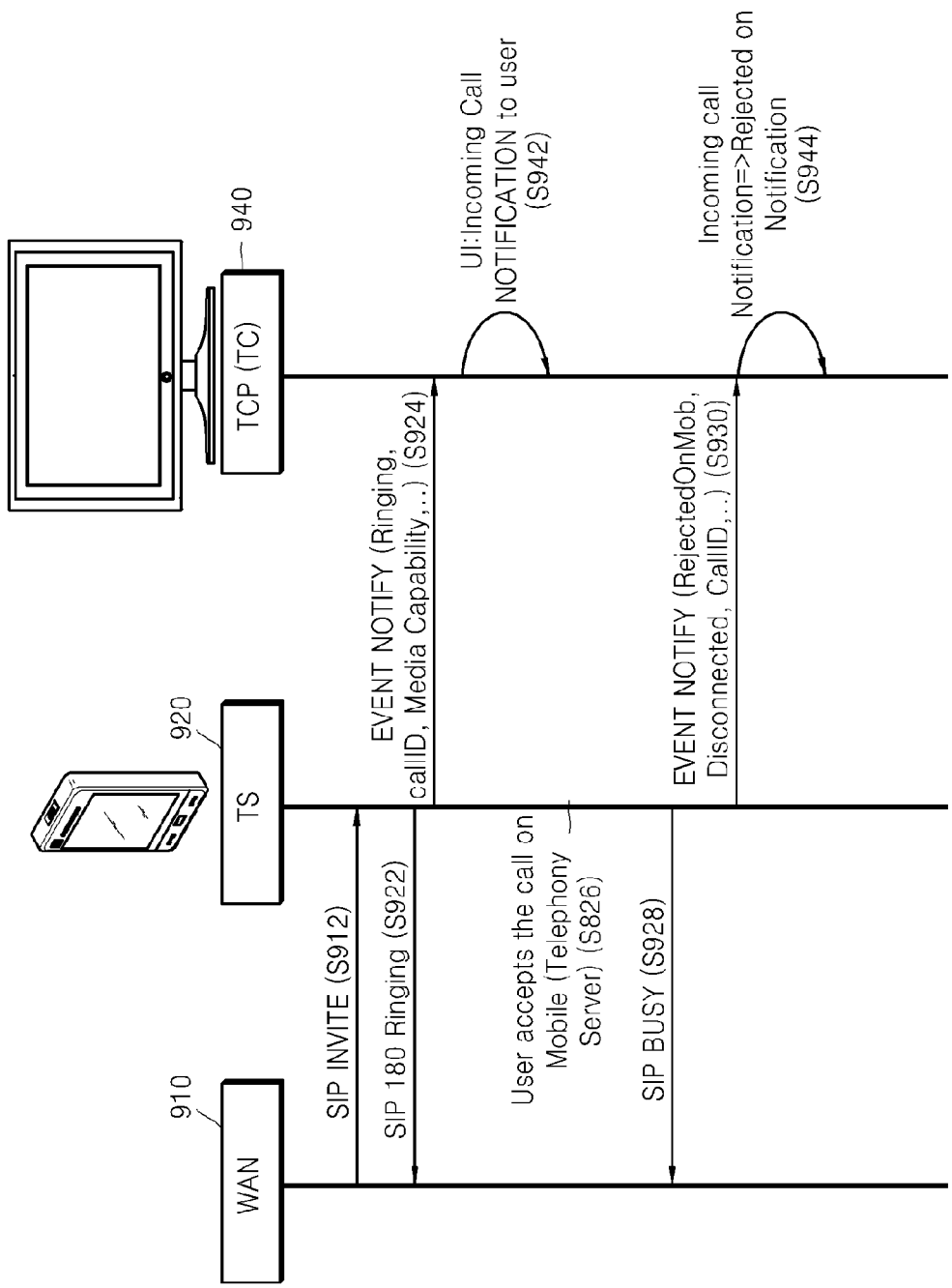
FIG. 9 is a flowchart of a method of notifying an operation state change of a first device and another device in a network, when a user responds to an operation state change of the first device, according to another exemplary embodiment.

FIG. 9 is a flowchart of a method of notifying an operation state change of a first device and another device in a network, when a user responds to an operation state change of the first device, according to another exemplary embodiment.

A user mobile phone 920 that is a telephony server (TS) corresponding to the first device, and a TV 940 configure the network. The TV 940 may be based on a TCP or may have a telephony client (TC) embedded therein.

A call signal from a caller is transmitted (INVITE) to the user mobile phone 920 via a WAN 910 (operation S912), and the caller is notified that the call signal is received (RINGING) by the user mobile phone 920 via the WAN 910 (operation S922).

The user mobile phone 920 may transmit operation state change information indicating reception of the call signal to the TV 940, and a user may be notified (EVENT NOTIFY) via the TV 940 that the user mobile phone 920 is currently receiving (RINGING) the call signal (operation 5924). The TV 940 may display a user interface for call notification on its display screen (operation 5942).

In a case where the user rejects the call signal so as not to accept call connection by using the user mobile phone 920 (operation 5926), the user mobile phone 920 may transmit a rejection message BUSY to the caller (operation S928), and may notify the user (EVENT NOTIFY) via the TV 940 that the call connection has been rejected by using the user mobile phone 920 (RejectedOnMob) (operation S930). Accordingly, the TV 940 may remove the user interface for call notification on the display screen and may newly display a user interface for indicating that the call signal has been rejected by using the user mobile phone 920 (Rejected on Mobile Notification) (operation S944).

Thus, in the method of notifying the operation state change of the first device and the other device according to an exemplary embodiment, the operation state change information including two pieces of information indicating 'the user rejects the call connection by using the user mobile phone 920' and 'the call connection is disconnected' is transmitted to the TV 940. The TV 940 may configure a user interface for notifying call rejection by the user, based on the received operation state change information of the user mobile phone 920, and may configure and provide an appropriate user interface screen according to a subsequent state change.

In the operation state change information of the mobile phone which is described above with reference to FIGS. 7 through 9, state change information including information indicating which device performs an operation state change, and current state information may be expressed as shown in Table 1 below.

TABLE 1

| Value | Call connection state | Description |
| --- | --- | --- |
| AcceptedonTS | Connected | Receiver accepts call connection by using mobile phone (telephony server; TS) |
| RejectedonTS | Disconnected | Receiver rejects call connection by using mobile phone (telephony server; TS) |

That is, the state change information of Table 1 may be transmitted to at least one device found as a device that is used by a user and that is from among devices in a network which are registered in a list.

The exemplary embodiments can be written as computer programs and can be implemented in general-use digital computers that execute the programs using a computer readable recording medium. In addition, a data structure used in the exemplary embodiments can be written in a computer readable recording medium through various means. Examples of the computer readable recording medium include magnetic storage media (e.g., ROM, floppy disks, hard disks, etc.), optical recording media (e.g., CD-ROMs, or DVDs), etc.

While inventive concept has been particularly shown and described with reference to exemplary embodiments thereof, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. A method of notifying an operation state change of a device in a network, the method comprising:

when the first device is changed to a second operation state by receiving a user response with respect to a change in a first operation state of the first device, searching for at least one device currently being used by a user in the network of devices among the devices in the network by receiving information indicating current use or non-use of the user; and transmitting information indicating a change in the second operation state of the first device to the at least one device currently being used, wherein the information indicating the change in the second operation state of the first device is displayed on a display unit of the at least one device currently being used.

2. The method of claim 1, wherein the user response is input to the first device or to the at least one device currently being used.

3. The method of claim 1, wherein the searching for the at least one device currently being used comprises:

waiting for an input from the user for a predetermined time after the first device is changed to the second operation state; and searching for the at least one device currently being used by the user in the network of devices after the predetermined time elapses.

4. The method of claim 3, wherein the predetermined time is set to be equal to or greater than 0.

5. The method of claim 1, wherein, after a state of the first device is changed, searching for the at least one device currently being used by the user in the network of devices.

6. The method of claim 1, wherein, when the at least one device currently being used by the user cannot be found in the network of devices, searching for the at least one device currently being used by the user in a sharing network accessible by the first device.

7. The method of claim 1, further comprising, after the network of devices is established, notifying the network of devices of a service supported by the first device and registering a list of devices from among the devices in the network that process an event related to the service supported by the first device.

8. The method of claim 7, wherein the searching for the at least one device currently being used comprises searching in the list of devices so as to search for the at least one device currently being used by the user in a sharing network accessible by the first device.

9. The method of claim 1, wherein, when the at least one device currently being used by the user cannot be found in the network of devices, searching for the at least one device currently being used by the user in a list of devices accessible by the first device.

10. The method of claim 1, wherein the searching for the at least one device currently being used comprises transmitting a search signal indicating a search for the at least one device currently being used by the user to one or more devices of the network of devices.

11. The method of claim 1, wherein the searching for the at least one device currently being used comprises receiving, from one or more devices of the network of devices, information indicating whether the one or more devices are currently being used by the user.

12. The method of claim 1, wherein the searching for the at least one device comprises:

checking if there has been an input to one or more devices of the network of devices from the user within a predetermined time; and determining a device to which there has been the input from the user within the predetermined time as the at least one device currently being used by the user.

13. The method of claim 1, wherein each device included in the network of devices comprises a display unit.

14. The method of claim 1, wherein the information indicating the change in the second operation state comprises at least one of notification information indicating occurrence of the change in a first operation state of the first device, detail information indicating details of the first operation state of the first device, notification information indicating occurrence of the change in the second operation state of the first device, and detail information indicating details of the second operation state of the first device.

15. The method of claim 1, wherein the transmitting of the information indicating the change in the second operation state comprises converting detail information indicating details of the second operation state into a format that is displayed by the at least one device and transmitting the converted detail information.

16. The method of claim 15, wherein the converted detail information is displayed by the at least one device through a management server of the network and transmitted to the at least one device currently being used.

17. The method of claim 1, wherein the change in the second operation state of the first device comprises message reception.

18. A method of notifying an operation state change of another device in a network, the method comprising:

when the first device is changed to a second operation state by receiving a user response with respect to a change in a first operation state of the first device, receiving information indicating a change in the second operation state by at least one device currently being used by a user, from the first device, which has searched for the at least one device currently being used by the user in the network among devices in the network by receiving information indicating current use or non-use of the user; and displaying the information regarding the operation state change of the first device on a display unit of the at least one device currently being used by the user.

19. The method of claim 18, further comprising generating, by a second device currently being used by the user in the network, a signal indicating that the user currently uses the second device.

20. The method of claim 19, wherein, when a search signal indicating a search for a device currently being used by the user is received from the first device, the generating of the signal comprises transmitting, by the second device currently being used by the user in the network, the signal indicating that the user currently uses the second device to the first device.

21. The method of claim 19, when it is recognized that the user currently uses the second device in the network, further comprising generating and transmitting, by the second device, the signal indicating the user currently uses the second device.

22. The method of claim 19, wherein the signal indicating the user currently uses the second device is generated based on at least one of whether there has been an input to the second device from the user within a predetermined time, whether the user logs into the second device, and a result of a sensor sensing the user.

23. The method of claim 18, wherein the displaying of the information on the display unit comprises setting a position or a size of a screen displaying notification information indicating occurrence of the operation state change of the first device on the display unit.

24. The method of claim 18, further comprising setting, by the at least one device in the network, whether to display notification information indicating occurrence of the operation state change of the first device on the display unit of the at least one device.

25. The method of claim 18, further comprising forwarding, by the at least one device in the network, the information indicating the change in the second operation state of the first device received from the first device to another device currently being used by the user in the network.

26. The method of claim 18, wherein the information indicating the change in the second operation state comprises notification information indicating occurrence of the change in the second operation state of the first device, and detail information indicating details of the second operation state of the first device.

27. The method of claim 26, further comprising:
acknowledging the notification information through a second device currently being used by the user; and
displaying the details of the operation state change of the first device on the second device based on the detail information.

28. The method of claim 26, further comprising:
converting the detail information into a format that is displayed by a second device currently being used by the user; and
displaying the details of the operation state change of the first device on the second device based on the format-converted detail information.

29. The method of claim 26, further comprising:
displaying the details of the second operation state of the first device on a second device currently being used by the user based on the detail information,
wherein the detail information is received by the second device after being converted into a format that is reproduced by the second device through a management server of the network.

30. The method of claim 26, further comprising:
displaying the details of the second operation state of the first device on a second device currently being used by the user based on the detail information,
wherein the detail information is received by the second device after being converted by the first device into a format that is reproduced by the second device.

31. The method of claim 26, wherein the change in the second operation state of the first device comprises message reception.

32. A device capable of notifying an operation state change thereof, the device comprising:
a network communication unit which performs network communication among devices that perform network communication; and
an operation state change information transmitting unit which searches for at least one device currently being used by the user in the network by receiving information indicating current use or non-use of the user when the operation state change of a first device in the network occurs, and which generates and transmits information regarding the operation state change of the first device to the at least one device,
wherein the information regarding the operation state change of the first device is displayed on a display unit of the at least one device, and
wherein, when the first device is changed to a second operation state by receiving a user response with respect to a change in a first operation state of the first device, the operation state change information transmitting unit transmits information indicating a change in the second operation state of the first device to the at least one device.

33. A device capable of notifying an operation state change of another device, the device comprising:
a network communication unit which performs network communication among devices comprising a first device used by a user and which performs network communication;
an other-device operation state change information reception unit which receives information regarding an operation state change of the first device by at least one device currently being used by the user, from the first device which has searched for the at least one device currently being used by the user in the network by receiving information indicating current use or non-use of the user;
a display unit; and
an other-device operation state change notification control unit which performs a control operation to display the information regarding the operation state change of the first device on the display unit,
wherein, when the first device is changed to a second operation state by receiving a user response with respect to a change in a first operation state of the first device, the other-device operation state change information reception unit receives information indicating a change in the second operation state from the first device.

34. A non-transitory computer-readable recording medium having recorded thereon a program which when executed by a computer performs the steps of:
when the first device is changed to a second operation state by receiving a user response with respect to a change in a first operation state of the first device, searching for at least one device currently being used by a user in the network of devices among the devices in the network by receiving information indicating current use or non-use of the user; and
transmitting information indicating a change in the second operation state of the first device to the at least one device currently being used,
wherein the information indicating the change in the second operation state of the first device is displayed on a display unit of the at least one device currently being used.

35. A non-transitory computer-readable recording medium having recorded thereon a program which when executed by a computer performs the steps of:
when the first device is changed to a second operation state by receiving a user response with respect to a change in a first operation state of the first device, receiving information indicating a change in the second operation state by at least one device currently being used by a user, from the first device, which has searched for the at least one device currently being used by the user in the network among devices in the network by receiving information indicating current use or non-use of the user; and
displaying the information regarding the operation state change of the first device on a display unit of the at least one device currently being used by the user.

* * * * *